United States Patent [19]

Gaylord

[11] Patent Number: 5,016,109
[45] Date of Patent: May 14, 1991

[54] APPARATUS AND METHOD FOR SEGMENTING A FIELD OF VIEW INTO CONTIGUOUS, NON-OVERLAPPING, VERTICAL AND HORIZONTAL SUB-FIELDS

[75] Inventor: William J. Gaylord, Stone Mountain, Ga.

[73] Assignee: Bell South Corporation, Atlanta, Ga.

[21] Appl. No.: 547,825

[22] Filed: Jul. 2, 1990

[51] Int. Cl.[5] .......................................... H04N 5/225
[52] U.S. Cl. .................................... 358/225; 358/87; 358/205; 350/171
[58] Field of Search ................ 358/225, 87, 250, 205, 358/206, 93, 89, 90, 91; 354/150, 120, 118, 122, 117, 68, 69, 70; 353/98, 99, 82, 77; 350/171 X, 174

[56] References Cited

U.S. PATENT DOCUMENTS

| | | | |
|---|---|---|---|
| 1,887,650 | 11/1932 | Larner | 353/98 |
| 2,219,149 | 10/1940 | Goldsmith | 178/6.8 |
| 2,267,813 | 10/1941 | Buckner | 88/16.6 |
| 3,118,340 | 1/1964 | Iwerks | 88/16.6 |
| 3,602,571 | 8/1971 | Norris | 358/206 |
| 3,602,572 | 8/1971 | Norris | 358/206 |
| 3,983,328 | 9/1976 | Newell | 178/6.8 |
| 4,056,827 | 11/1977 | Spooner et al. | 358/87 |
| 4,078,860 | 3/1978 | Globus et al. | 352/69 |
| 4,323,925 | 4/1982 | Abell | 358/225 |
| 4,373,169 | 2/1983 | Burkam | 358/104 |
| 4,660,096 | 4/1987 | Arlan | 358/310 |
| 4,890,314 | 12/1989 | Judd et al. | 359/53 |

Primary Examiner—John K. Peng
Assistant Examiner—Sherrie Hsia
Attorney, Agent, or Firm—Robin, Blecker, Daley & Driscoll

[57] ABSTRACT

An apparatus for segmenting a field of view into contiguous, non-overlapping vertical horizontal sub-fields comprising a pyramid shaped element have reflective facets and arranged and configured such that the side facets develop the sub-fields.

33 Claims, 5 Drawing Sheets

APPARATUS AND METHOD FOR SEGMENTING A FIELD OF VIEW INTO CONTIGUOUS, NON-OVERLAPPING, VERTICAL AND HORIZONTAL SUB-FIELDS

BACKGROUND OF THE INVENTION

This invention relates to a method and apparatus for segmenting a field of view and, in particular, to a method and apparatus for developing sub-fields of the field of view.

To facilitate recording and reproduction of images in formats which require resolution beyond the capabilities of a single camera target, composite camera systems have been proposed in which the field of view is divided or segmented into sub-fields each of which is received by one of multiple camera targets and recorded. To display the recorded image, the sub-field images are projected simultaneously in their appropriate relationship. Since the target used to record each sub-field has the same resolution as the target normally used for the entire camera field of view, the resolution of the displayed image of the sub-fields will be increased in dependence on the number of sub-fields used. As a result, a desired increase in resolution of the reproduced image can be achieved.

In order for the above camera systems to be free of undue degradation, the developed sub-fields must be contiguous and non-overlapping. This can be achieved by designing the system so that the sub-fields have a common focal point. A system designed in this manner which develops sub-fields both horizontally and vertically is disclosed in Goldsmith U.S. Pat. No. 2,219,149.

In the Goldsmith system, the field of view is conveyed by the system lens to a first mirror arrangement which segments the field of view horizontally into two contiguous, non-overlapping sub-fields. Each sub-field is then directed to its own lens/mirror arrangement which segments the respective sub-field vertically to develop two smaller, contiguous, non-overlapping sub-fields. The overall result of the arrangement is thus the production of four sub-fields which are contiguous and non-overlapping in both the horizontal and vertical direction.

The Judd et al. U.S. Pat. No. 4,890,314 also discloses a system in which contiguous, non-overlapping sub-fields are developed. In the disclosed embodiments in Judd, the sub-fields are produced only in the horizontal direction.

The Goldsmith and Judd systems are disadvantageous in a number of respects. Thus, the Goldsmith system is not compact because the system requires multiple mirror arrangements to segment the field of view horizontally and then vertically. The Judd embodiments on the other hand, only provide horizontal sub-fields and not both horizontal and vertical sub-fields.

It is therefore an object of the present invention to provide an improved apparatus and method for segmenting a field of view into contiguous, non-overlapping vertical and horizontal sub-fields.

It is a further object of the present invention to provide a camera system incorporating the apparatus and method described in the previous objective and to further provide a high definition television (HDTV) system utilizing the camera system.

SUMMARY OF THE INVENTION

In accordance with the principles of the present invention, the above and other objectives are realized in an apparatus and method in which a field of view is divided into contiguous, non-overlapping horizontal and vertical sub-fields using a pyramid shaped element, having reflective side facets or faces and arranged and configured such that the facets form or develop the sub-fields.

In the embodiment of the invention to be disclosed hereinafter, the pyramid shaped element is incorporated into a camera system by situating the pyramid shaped element with its apex and axis along the optical axis of the lens of the camera system. Camera targets are then situated to receive the sub-fields developed by the facets of the pyramid shaped element. Each sub-field may be directed to its target by a corresponding mirror arranged in facing, parallel relationship to a respective facet.

Also disclosed is in HDTV system incorporating the camera system.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
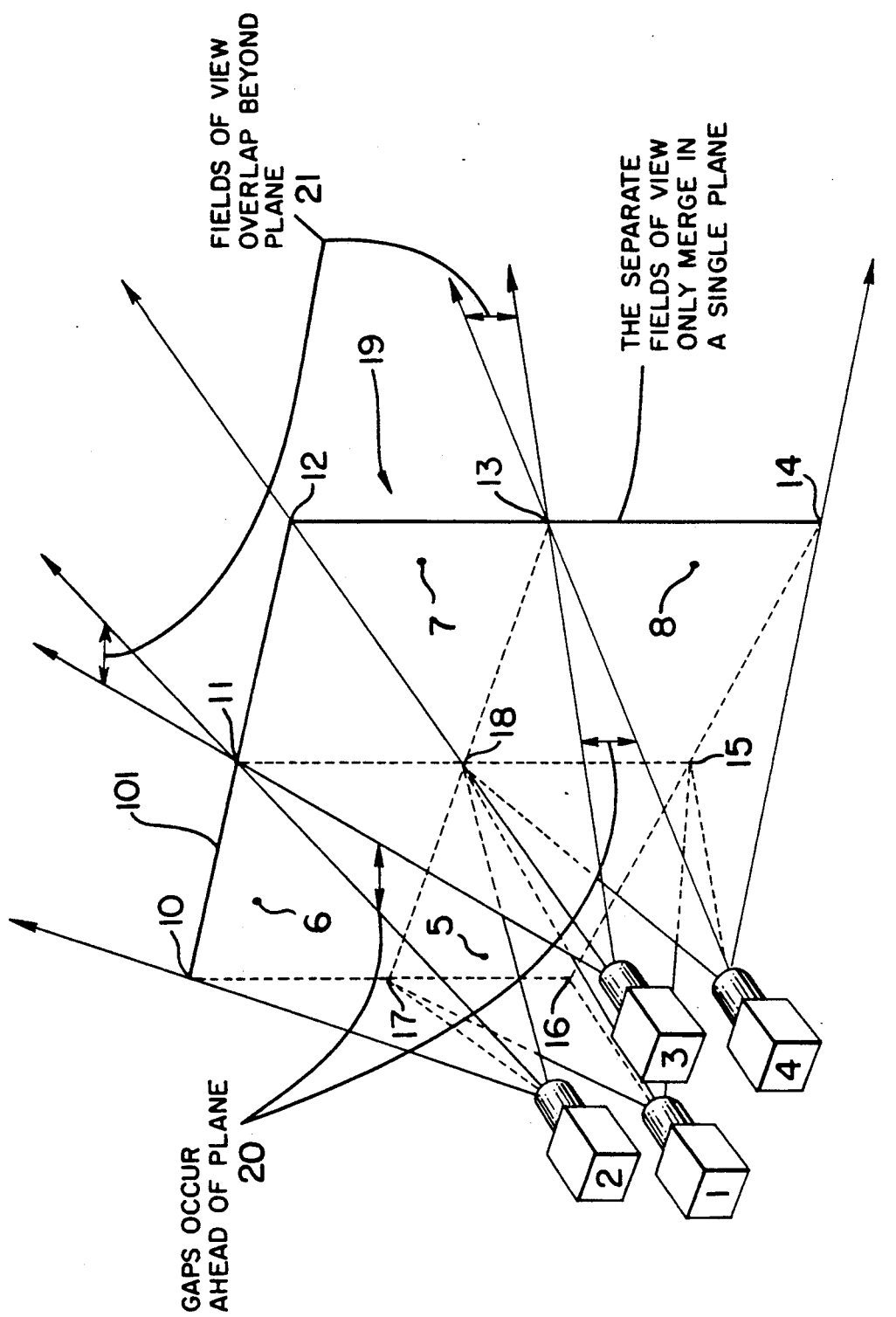
FIG. 1, included for explanation purposes, shows noncontiguous, overlapping sub-fields of view which are developed with multiple cameras having different focal points.

In FIG. 1, four separate cameras or camera targets 1, 2, 3 and 4 having separate focal points view four sub-fields 5, 6, 7 and 8 of a field of view 101 which is bounded by points 10, 12, 14 and 16. The field of view 101 is in a plane 19 which is perpendicular to the optical axes or lines-of-sight of the camera targets. As shown, in the plane 19, sub-field 5 is bounded by points 15, 16 17, and 18, sub-field 6 by points 18, 17, 10 and 11, sub-field 7 by points 13, 18 11, and 12 and sub-field 8 by points 14, 15, 18 and 13.

Because the camera focal points are different, the sub-fields 5-8 are contiguous only in the plane 19. In planes forward of plane 19, the sub-fields 5-8 overlap as is shown at locations 21. In planes in back of plane 19, gaps appear between the sub-fields 5-8 as is shown at locations 20. Therefore, the practical use of the camera system of FIG. 1 for developing sub-fields of a field of view for use in high resolution image reproduction is extremely limited, since only sub-fields located within the single plane 19 can be merged to reconstruct the field of view without degradation.

Figure 2:
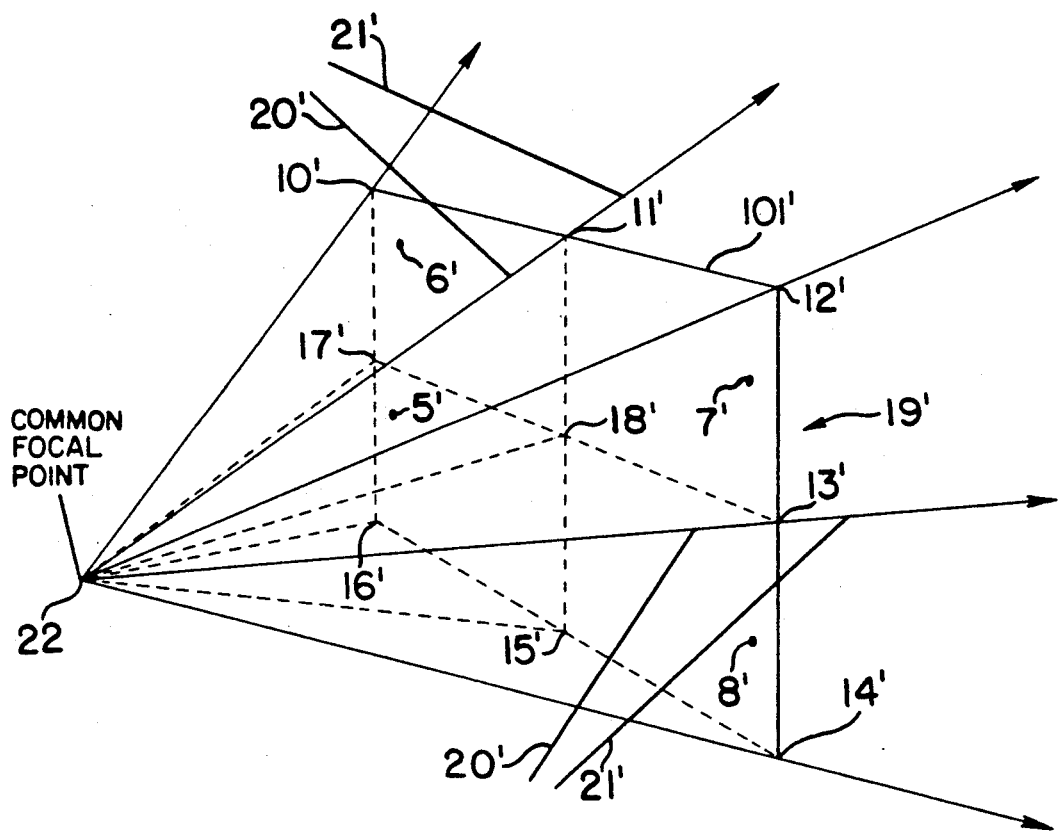
FIG. 2, also included for explanation purposes, shows contiguous, non-overlapping vertical and horizontal sub-fields having a common focal point.

FIG. 2 illustrates four sub-fields 5', 6', 7' and 8' of a field of view 101 developed by four camera targets having a common focal point 22. As can be seen, in plane 19', the sub-fields 5' to 8' are contiguous and non-overlapping, with the sub-field 5' bounded by points 15', 16', 17', and 18', the sub-field 6' by points 18', 17', 10' and 11', the sub-field 7' by points 13', 18', 11' and 12' and the sub-field 8' by points 14', 15', 18' and 13'. Since the sub-fields 5'-8' have a common focal point, however, the sub-fields are not only contiguous, and non-overlapping in plane 19', but in all other parallel planes in front of and in back of the plane 19. As a result, regardless of the plane in which the field of view 101' lies, the developed sub-fields 5'-8' can be recombined to reproduce the field of view 101' without degradation. As can be appreciated, a camera system capable of developing the sub-fields of FIG. 2 offers a much more attractive mechanism for high resolution reproduction than the camera system of FIG. 1.

Figure 3:
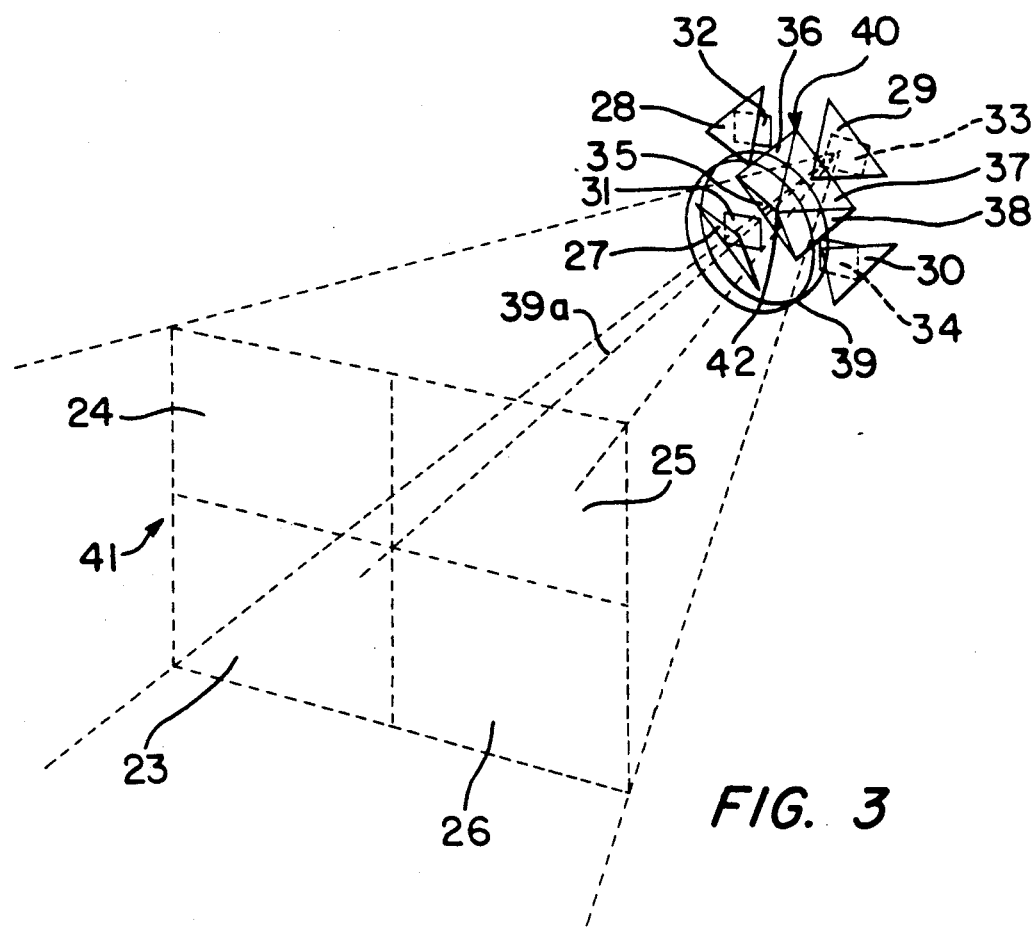
FIG. 3 shows a camera system which includes an apparatus in accordance with the principles of the present invention for developing the sub-fields shown in FIG. 2.
Figure 4:
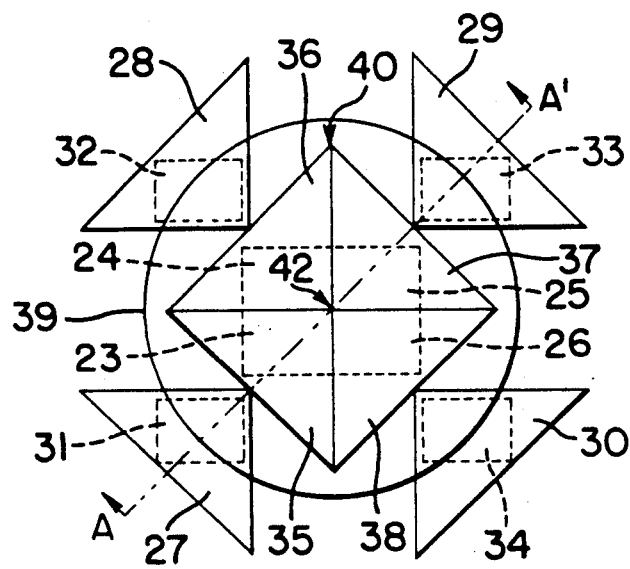
FIG. 4 illustrates the camera system of FIG. 3 as viewed from a position along the optical axis of the field of view.
Figure 5:
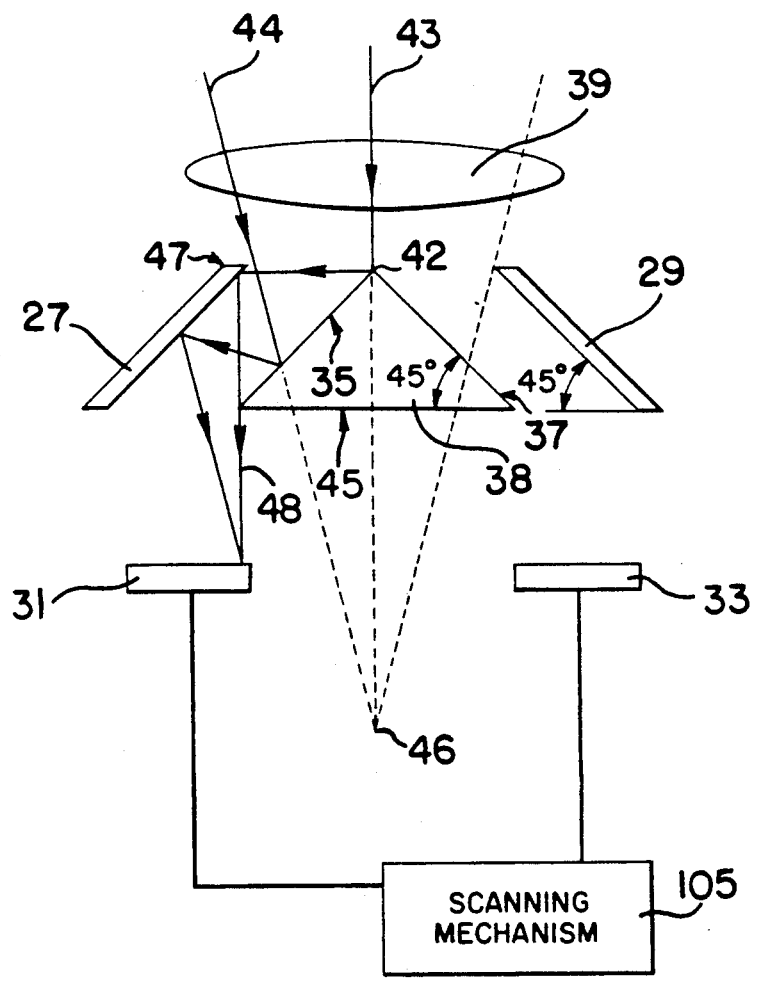
FIG. 5 illustrates a view of the camera system of FIG. 3 taken along the line AA' of FIG. 4.

FIGS. 3-5 illustrate a compact camera system in accordance with the principles of the present invention for realizing the sub-fields of FIG. 2. More particularly, as shown, the camera system comprises a lens 39 which captures a field of view 41 and conveys it to a reflective or mirror element 40. The mirror element 40 then segments the field of view into four contiguous, non-overlapping vertical and horizontal sub-fields 23-26.

In accordance with the invention, element 40 is a pyramid shaped element having mirrored or reflective facets 35-38 which, in the case shown, are four in number. The element 40 is situated with its apex 42 and its axis 42a along the line-of-sight or optical axis 39a of the lens 39. The element 40 is further characterized, in the illustrative case, by having a square base 45 and each facet 35-38 set at a forty-five degree angle with respect to the base.

With this configuration and arrangement for the element 40, the reflective facets 35-38 have the focal point of the lens as a common focal point and each is able to develop one of the contiguous, non-overlapping sub-fields 23-26. The developed sub-fields 23-26 are then reflected by their respective facets and directed to respective flat reflective elements or mirrors 27-30. Each mirror 27-30 is aligned parallel to its respective facet 35-38 and directs the received sub-field to one of four camera targets 31-34 of the camera system. These targets are positioned parallel to the base 45 of the reflective element 40. Thus, the camera system targets receive contiguous, non-overlapping sub-fields of the field of view.

In FIG. 4, the camera system of FIG. 3 is shown as viewed from a position along the lens optical axis 39. In this view, the optical axis is projected perpendicular to the paper and each of the sub-fields 23-26 are shown as they reach the central mirror element 40. As can be seen, the diagonal axes of the base 45 of the element 40 align with the horizontal and vertical innermost edges of the sub-fields.

The combination of the facet mirrors 35-38 and the flat surface mirrors 27-30 of the camera system displace each sub-field 23-26 far enough away from the optical axis 39 so as not to be blocked by the base 45 of the element 40. This allows for easy physical placement of the camera targets 31-34. FIG. 5, which is a cross sectional view along the line AA' in FIG. 4, more clearly shows this.

More particularly, as can be seen in FIG. 5, the optical ray 43 at the innermost corner of the sub-field 23, which ray is along the optical axis 39, is displaced by reflective facet 35 to the flat mirror 27. The mirror 27 then reflects the ray so that it clears the base 45 of the element 40 and is, therefore, able to reach the camera target 31. A second optical ray 44, representing the outermost corner of the sub-field 23, is also shown. This ray is displaced by reflective facet 35 and mirror 27 so that it also reaches the camera target 31. A continuum of all other rays (not shown) from the sub-field 23 are likewise reflected by the facet 35 and mirror 27 onto the camera target 31.

The location of each camera target 31-34 along the optical axis (as reflected by the facets and mirrors) is determined by the size of the camera target. A smaller camera target will be place further away from the base 45 and a larger camera target placed closer to the base 45 (as measured along the optical axis.)

As can be appreciated, in the camera system of FIGS. 3-5, each sub-field is reflected by two surfaces, i.e., a facet and a corresponding flat mirror, in the path of the sub-field. Each sub-field is, therefore, reversed twice resulting in the preservation of the sub-field's orientation.

The camera system of FIGS. 3-5 is advantageous in enabling the recording of contiguous, non-overlapping vertical and horizontal sub-fields with a high degree of precision and in a physically compact assembly, limited only by the aforementioned distance requirement between the facets and the flat surface mirrors. Additionally, the use of mirrors for reflecting the sub-fields avoids both refraction and attenuation as can occur with prisms and lenses. Also, the relative alignment between the lens 39, the facets 35-38 and the mirrors 27-30 remains fixed, thereby avoiding the need to adjust these components relative to each other. The only adjustment necessary might be adjusting the positioning of the edges of the camera targets which can be readily achieved either electrically or electromechanically. Finally, once the camera targets have been aligned, any lens of sufficient size and focal length can be used for the lens 39 to focus the field onto the targets without necessitating realignment.

In the camera systems of FIGS. 3-5, each camera target upon receiving its sub-field converts the image received into an electrical signal which can be read by scanning the target. Conventional scanning equipment is included in the camera systems of FIGS. 3-5 for this purpose, as schematically illustrated by the scanning mechanism 105 in FIG. 5.

A typical type of target used for the camera targets 31-34 might be a video camera target whose surface material develops an electrical charge pattern based on the received image. For CRT video type camera targets, electron beam scanning equipment would be used to scan the charge pattern and develop a corresponding electrical signal.

Figure 6:
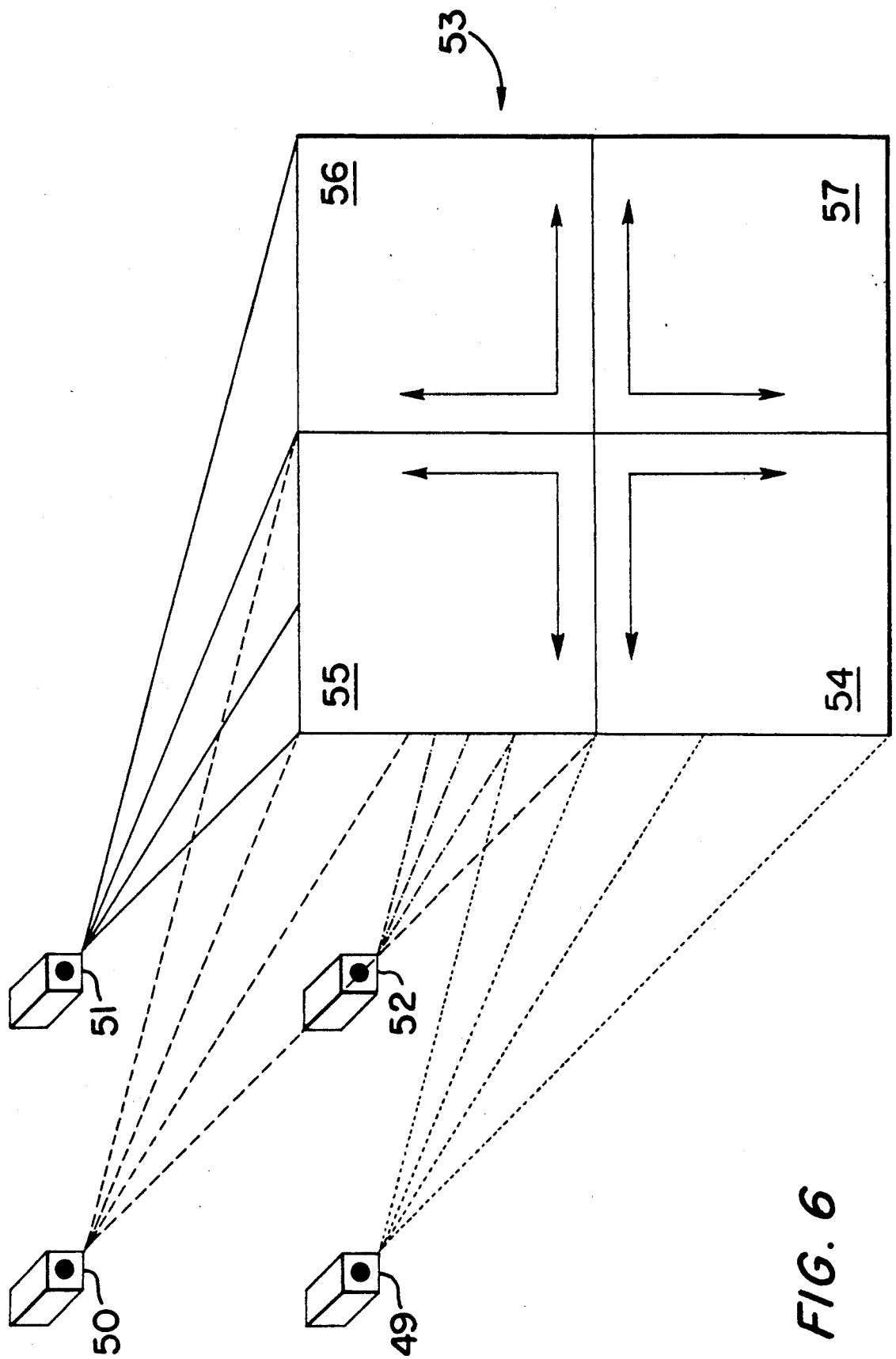
FIG. 6 shows a system for simultaneously combining and displaying the sub-fields developed by the camera system of FIGS. 3-5 to reconstruct the field of view and image.

In FIG. 6, a system for simultaneously displaying the images of the sub-fields captured by the four camera targets 31-34 of the camera system of the invention is shown. The electrical signals obtained from scanning the camera targets 31-34 are provided to respective projectors 49-52. The projectors 49-52 are positioned so that the projected sub-field images 54-57 are closely adjacent to each other in both the horizontal and vertical direction. The composite image 53 formed by the four sub-fields 54-57 is thus a reproduction of the image of the field of view 41 viewed by the camera system. As can be appreciated, however, the resolution of the projected image will be greater than the resolution obtained if a single camera target and a single projector were used to reproduce the same field of view, since each sub-field has the resolution of a single camera/single projector combination.

In FIG. 6, the arrows in each sub-field projection 54-57 indicate the directions in which the corresponding camera targets should be scanned to prevent degradation of the image at the inner boundaries of the sub-fields due to movement across the boundaries. This order of scanning in recording images is required because the scanning of a frame of the image on a target takes a finite amount of time. If adjacent elements on opposite sides of a sub-field boundary are not scanned and displayed at close to the same instant, then motion of an object across the boundary will not be smooth. The scanning order in recording images illustrated assures that elements near the boundaries are displayed at the same time or very close to the same time, thus preventing moving objects from rendering the boundary visible.

Figure 7:
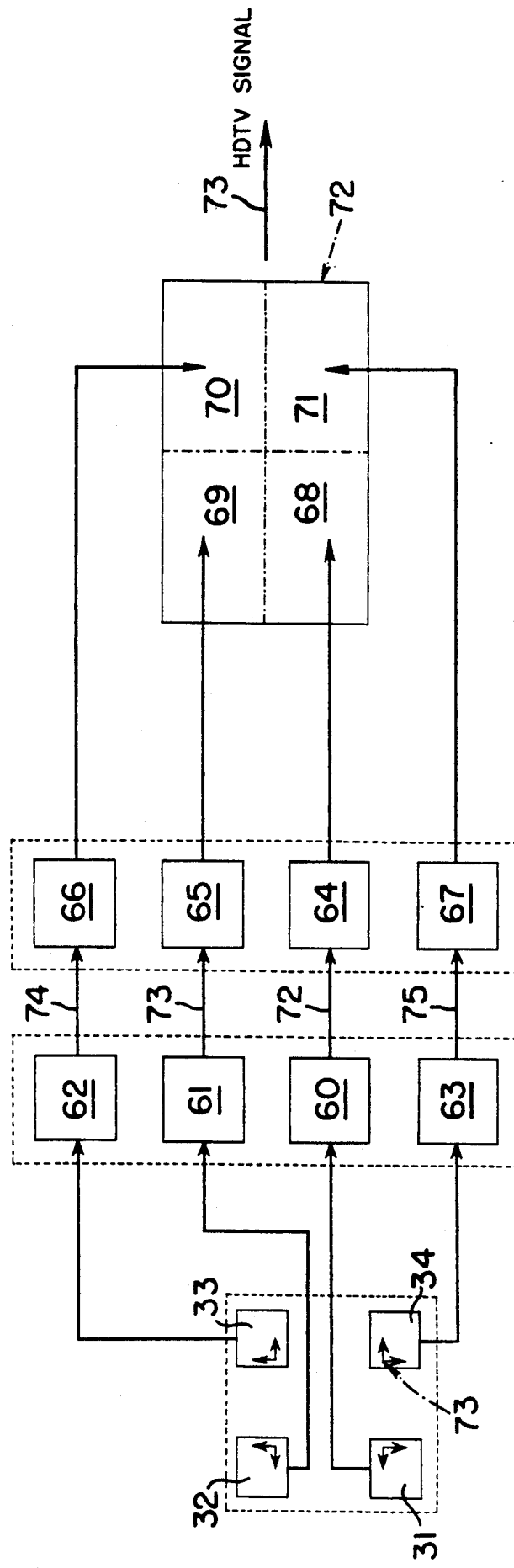
FIG. 7 shows a schematic representation of a system for forming an HDTV signal based upon the signals developed by the camera system of FIGS. 3-5.

FIG. 7 illustrates an HDTV system which has been adapted for use with the camera system of the present invention so as to enable the HDTV system to provide 1050 progressively scanned lines at a frame rate of 60 frames a second. While HDTV systems providing 525 progressively scanned lines at 60 frames a second have been achieved to date, systems having 1050 lines have not been achieved due to the limitations on the ability to scan available targets.

In FIG. 7, the contiguous, non-overlapping sub-field images (not shown) captured by camera targets 31-34 of the camera system of the invention are progressively scanned at a 525 line sixty frame per second rate by corresponding conventional analog scanning circuits 60-63. This scanning is done in the directions of arrows 75 in order to preserve image integrity at the inner boundaries as above-described.

The analog outputs 72-75 from the circuits 60-63 are then converted by corresponding analog to digital (A/D) converters 64-67 to digital representations and stored in corresponding locations 68-71 in a line frame buffer 72. The contents of the line frame buffer 72 are then read out sequentially by a conventional read out device to produce a 1050 line, sixty frames per second progressively scanned HDTV signal. In this way, the system of FIG. 7 is able circumvent the limitations of present camera target technology in order to construct a sixty frame per second, 1050 line, HDTV system not otherwise attainable.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. An apparatus for segmenting a field of view into contiguous, non-overlapping horizontal and vertical sub-fields, the apparatus comprising:
   a pyramid shaped element having reflective side facets, the pyramid shaped element being oriented and configured such that the side facets develop the sub-fields.

2. An apparatus in accordance with claim 1 further comprising:
   optical means for conveying said field of view to said pyramid shaped element.

3. Apparatus in accordance with claim 2 wherein:
   said optical means comprises a lens having an optical axis;
   and said pyramid shaped element is arranged with its axis along said optical axis.

4. Apparatus in accordance with claim 1 further comprising:
   a mirror facing each side facet and arranged to receive and reflect the sub-field developed by the respective facet without obstruction from the pyramid shaped element.

5. An apparatus in accordance with claim 4 wherein:
   each said mirror is parallel to the corresponding facet.

6. Apparatus in accordance with claim 1 wherein:
   the number of facets of said pyramid shaped element is four;
   and said pyramid shaped element develops from said field of view four sub-fields.

7. Apparatus in accordance with claim 6 wherein:
   said field of view is rectangular;
   and each said sub-field is rectangular.

8. Apparatus in accordance with claim 7 wherein:
   each said sub-field is substantially the same size.

9. Apparatus in accordance with claim 6 wherein:
   each said side facet is at a 45° angle relative to the base of the pyramid shaped element.

10. A composite camera system for recording contiguous, non-overlapping horizontal and vertical sub-fields of a field of view comprising:
    a pyramid shaped element having reflective side facets, the pyramid shaped element being orientated and configured such that the side facets develop the sub-fields;
    and camera targets each for receiving the sub-field developed by a different one of said facets.

11. A camera system in accordance with claim 10 further comprising:
    optical means for conveying said field of view to said pyramid shaped element.

12. Apparatus in accordance with claim 11 wherein:
    said optical means comprises a lens having an optical axis; and
    said pyramid shaped element is arranged with its axis along said optical axis.

13. Apparatus in accordance with claim 10 further comprising:
    a mirror facing each side facet and arranged to receive and reflect the sub-field developed by the respective facet without obstruction from the pyramid shaped element.

14. A camera system in accordance with claim 13 wherein:
    each said mirror is parallel to the corresponding facet.

15. A camera system in accordance with claim 10 wherein:
    the number of facets of said pyramid shaped element is four;

said pyramid shaped element develops from said field of view four sub-fields.

16. A camera system in accordance with claim 15 wherein:
said field of view is rectangular;
and each said sub-field is rectangular.

17. A camera system in accordance with claim 16 wherein:
each said sub-field is substantially the same size.

18. A camera system in accordance with claim 15 wherein:
each said side facet is at 45° angle relative to the base of the pyramid shaped element.

19. A camera system in accordance with claim 10 wherein:
each said camera target is positioned in a plane parallel to the base of said pyramid shaped element.

20. A camera system in accordance with claim 10 further comprising:
means for scanning each target to develop an electrical signal related to the image of the sub-field received by the target.

21. A camera system in accordance with claim 20 wherein:
each target is scanned horizontally starting from an elemental area of the sub-field bordering its adjacent sub-fields.

22. A system for forming a high definition television (HDTV) signal corresponding to a field of view comprising:
a composite camera including: apparatus for segmenting said field of view into contiguous, non-overlapping horizontal and vertical sub-fields, said apparatus comprising a pyramid shaped element having reflective side facets, the pyramid shaped element being oriented and configured such that the side facets develop the sub-fields; and camera targets each for receiving the sub-fields developed by a different side-facet;
means for progressively scanning each said sub-field formed on each said camera target to develop scanned signals;
and means for storing said scanned signals.

23. A system in accordance with claim 22 further comprising:
means for digitizing said scanned signals prior to said storing.

24. An system in accordance with claim 22 wherein:
said scanning means progressively scans each sub-field at a 525 line 60 frame per second scan rate.

25. An apparatus in accordance with claim 24 wherein:
said storing means is a line buffer capable of storing 1050 scanned lines.

26. A system in accordance with claim 22 further comprising:
means for synchronizing said progressive scanning of each said camera target.

27. An apparatus in accordance with claim 26 wherein:
said means for synchronizing said progressive scanning causes adjacent boundaries of each said sub-fields to be scanned at close to the same time.

28. A method for segmenting a field of view into contiguous, non-overlapping horizontal and vertical sub-fields, the method comprising:
arranging a pyramid shaped element having reflective side facets to receive said field of view, the pyramid shaped element being oriented and configured such that the side facets develop the sub-fields.

29. A method in accordance with claim 28 further comprising:
conveying said field of view to said pyramid shaped element with a lens;
and arranging said pyramid shaped element with its axis along the optical axis of said lens.

30. A method for recording contiguous, non-overlapping horizontal and vertical sub-fields of a field of view comprising:
arranging a pyramid shaped element having reflective side facets to receive said field of view, the pyramid shaped element being orientated and configured such that the side facets develop the sub-fields;
and arranging camera targets to receive the sub-fields developed by different ones of said facets.

31. A method for forming a high definition television (HDTV) signal corresponding to a field of view comprising:
segmenting said field of view into contiguous, non-overlapping horizontal and vertical sub-fields by arranging a pyramid shaped element having reflective side facets to receive the field of view, the pyramid shaped element being oriented and configured such that the side facets develop the sub-fields;
arranging camera targets to receive the sub-fields developed by different ones of said side facets;
progressively scanning each said sub-field formed on each said camera target to develop scanned signals;
and storing said scanned signals.

32. The method in accordance with claim 31 wherein:
said scanning progressively scans each sub-field at a 525 line 60 frame per second scan rate.

33. The method in accordance with claim 31 wherein:
progressive scanning causes adjacent boundaries of each said sub-fields to be scanned at close to the same time.

* * * * *